United States Patent [19]

Bristow et al.

[11] Patent Number: 5,142,470
[45] Date of Patent: Aug. 25, 1992

[54] METHOD OF MAINTAINING SYNCHRONIZATION OF A FREE-RUNNING SECONDARY PROCESSOR

[75] Inventors: Robert W. Bristow, Hatboro; Paul F. McLaughlin, Hatfield, both of Pa.

[73] Assignee: Honeywell Inc., Minneapolis, Minn.

[21] Appl. No.: 588,211

[22] Filed: Sep. 26, 1990

[51] Int. Cl.⁵ ...................... G06F 11/20; G06F 15/46
[52] U.S. Cl. ................................. 364/184; 364/187; 364/132
[58] Field of Search ............... 364/131, 132, 184, 187; 371/9.1

[56] References Cited

U.S. PATENT DOCUMENTS

| | | | |
|---|---|---|---|
| 4,141,066 | 2/1979 | Keiles | 371/9.1 |
| 4,607,256 | 8/1986 | Henzel | 364/187 |
| 4,958,270 | 9/1990 | McLaughlin et al. | 364/187 |
| 4,959,768 | 9/1990 | Gerhart | 364/187 |
| 5,008,805 | 4/1991 | Fiebig et al. | 364/184 |
| 5,088,021 | 2/1992 | McLaughlin et al. | 364/187 |

Primary Examiner—Jerry Smith
Assistant Examiner—Paul Gordon
Attorney, Agent, or Firm—A. A. Sapelli; D. Lenkszus; W. Udseth

[57] ABSTRACT

Data bases of a first and second input output processor (IOP), which are primary and secondary slave IOPs, respectively, are sychronized, and communications by a master controller is made only to the first IOP. Each IOP is executing the same tasks utilizing their own clocking systems. A method for maintaining synchronization between the first and second IOP comprises the steps of transmitting a message addressed to the first IOP by the master controller. The first IOP receives the message for subsequent execution. Receipt of the message is acknowledged by a transmission back to the master controller the acknowledge message including a message number. The second IOP eavesdrops on the transmissions between the master controller and any of the IOPs on the network. Upon recognizing that the message is addressed to the corresponding first IOP and that the message is of a predetermined type, the second IOP receives the message for subsequent execution. The second IOP verifies the message number in the acknowledge message, the message number being determinable by the second IOP, such that when both the first and second IOP complete execution of the received message which results in an update of the respective data bases, both data bases continue to contain the same information thereby maintaining synchronization.

7 Claims, 9 Drawing Sheets

PRIMARY

| COMMAND | MESSAGE NUM. |
|---|---|
| | |
| CMD5 | 27 |
| FREEZE | 26 |
| CMD4 | 25 |
| CMD3 | 24 |
| CMD2 | 23 |
| CMD1 | 22 |
| | |

SECONDARY

| COMMAND | MESSAGE NUM. |
|---|---|
| | |
| | |
| CMD5 | 27 |
| FREEZE | 26 |
| CMD4 | 25 |
| CMD3 | 24 |
| | |

METHOD OF MAINTAINING SYNCHRONIZATION OF A FREE-RUNNING SECONDARY PROCESSOR

RELATED PATENT APPLICATIONS

The present application is related to U.S. Pat. application, Ser. No. 07/588,386, entitled "Universal Scheme of Input/Output Redundancy in a Process Control System" by Paul McLaughlin et. al., filed on even date herewith, and assigned to Honeywell Inc., the assignee of the present application.

BACKGROUND OF THE INVENTION

The present invention relates to a method of data base maintenance, and more particularly, to a method of synchronizing and maintaining synchronization of a secondary slave processor to a primary slave processor, wherein the primary and secondary slave processors are each utilizing separate clocks. Further, the two slave processors cannot initiate messages to one another or communicate directly with one another.

Process Control Systems with backup process controllers such as described and claimed in U.S. Pat. No. 4,133,027, issued to J.A. Hogan on Jan. 2, 1979, and U.S. Pat. No. 4,141,066, issued to Y. Keiles on Feb. 20, 1979, include a backup controller having a dedicated Random Access Memory (RAM) and a dedicated Read-Only Memory (ROM). The backup controller is essentially idle or can be doing some background tasks, but not tasks relating directly to the process control function. Upon detection of a failure of one of the primary process controllers, the data stored in the RAM of the failed controller must be transferred to the RAM of the backup controller to perform the operations of the primary controller. These systems describe a 1:N redundancy system.

Existing systems, such as that described in U.S. Pat. No. 4,958,270, and assigned to Honeywell Inc., the assignee of the present application, provide for a 1:1 redundancy system, whereby the data base of a secondary device (i.e., secondary or backup controller) is updated periodically such that the updating process is transparent to the primary functions and does not tie-up (or penalize) CPU or processor performance and utilizes a minimum amount of time. When a failover condition occurs, there is a period of time when no communications can take place (i.e., an outage) between the primary controller and the remainder of the system. Further, the primary and secondary controllers are in a predefined location, and the software utilized for implementing this redundancy feature (i.e., redundancy software) is not transparent to other layers of software above the redundancy software. For example, if a Universal Station of a plant control network were to interrogate a controller (i.e., a primary controller since the secondary controller cannot be interrogated), of a process controller of a process control system, for a value, during failover the controller is unable to respond and the universal station outputs question marks on the display to the operator.

The present invention provides a method which synchronizes and maintains synchronization of a data base in a primary and secondary slave processor pair that exists on a communication network where neither processor can initiate communications to the other processor. The present invention accomplishes a one-time transfer of data from the primary to the secondary, which is achieved by the secondary eavesdropping on all communications between the primary and master. The secondary, which eavesdrops on all messages to the primary, also acts on all messages internally. However, the secondary does not respond to the master controller but does eavesdrop on communications from the primary to the master controller to verify valid communications. The primary and secondary slave processor cannot initiate communications to each other, and have no direct data path but the communications path to the master controller. The eavesdropping of messages to the primary by the secondary has no impact on communications throughput by the addition of the secondary (or redundant) processor. Further, the initial synchronization occurs in parallel with other communications, hence communications with other processor on the network of a process control system is not disturbed during the one-time synchronization of the primary and secondary slave processors.

SUMMARY OF THE INVENTION

Thus there is provided by the present invention, a method for the initial synchronization and the maintaining of that synchronization of a primary and secondary slave processor of a process control system.

In a process control system, having a master controller and at least one pair of slave input/output processors (IOPs), a first IOP of the pair is a primary slave IOP and a second IOP of the pair is a secondary slave IOP. The first and second IOP have a first and second data base, respectively, the first and second IOP each executing the same tasks utilizing a first and second clocking system, respectively. The data bases of the first and second IOPs are synchronized, communications by the master controller being made only to the first IOP including communications which modify the first data base. A method for maintaining synchronization between the first and second IOP comprises the steps of transmitting a message addressed to the first IOP by the master controller. The first IOP receives the message for subsequent execution. Receipt of the message is acknowledged by a transmission back to the master controller, the acknowledge message including a message number. The second IOP eavesdrops on the transmissions between the master controller and any of the IOPs on the network. Upon recognizing that the message is addressed to the corresponding first IOP and that the message is of a predetermined type, the second IOP receives the message for subsequent execution. The second IOP verifies the message number in the acknowledge message of the primary IOP, the message number being determinable by the second IOP, such that when both the first and second IOP complete execution of the received message which results in an update of the respective data bases, both data bases continue to contain the same information thereby maintaining synchronization.

Accordingly, it is an object of the present invention to provide a method for synchronizing and maintaining the synchronization of a primary and secondary slave processor.

It is another object of the present invention to provide a method for synchronizing and maintaining the synchronization of a primary and secondary slave processor connected to a network of a process control system.

It is still another object of the present invention to provide a method for synchronizing and maintaining the synchronization of a primary and secondary slave processor connected to a network, wherein the slave processor cannot initiate communication with each other.

These and other objects of the present invention will become more apparent when taken in conjunction with the following description and attached drawings, wherein like characters indicate like parts, and which drawings form a part of the present application.

BRIEF DESCRIPTION OF THE DRAWINGS

FIG. 9, which comprises

DETAILED DESCRIPTION

Figure 1:
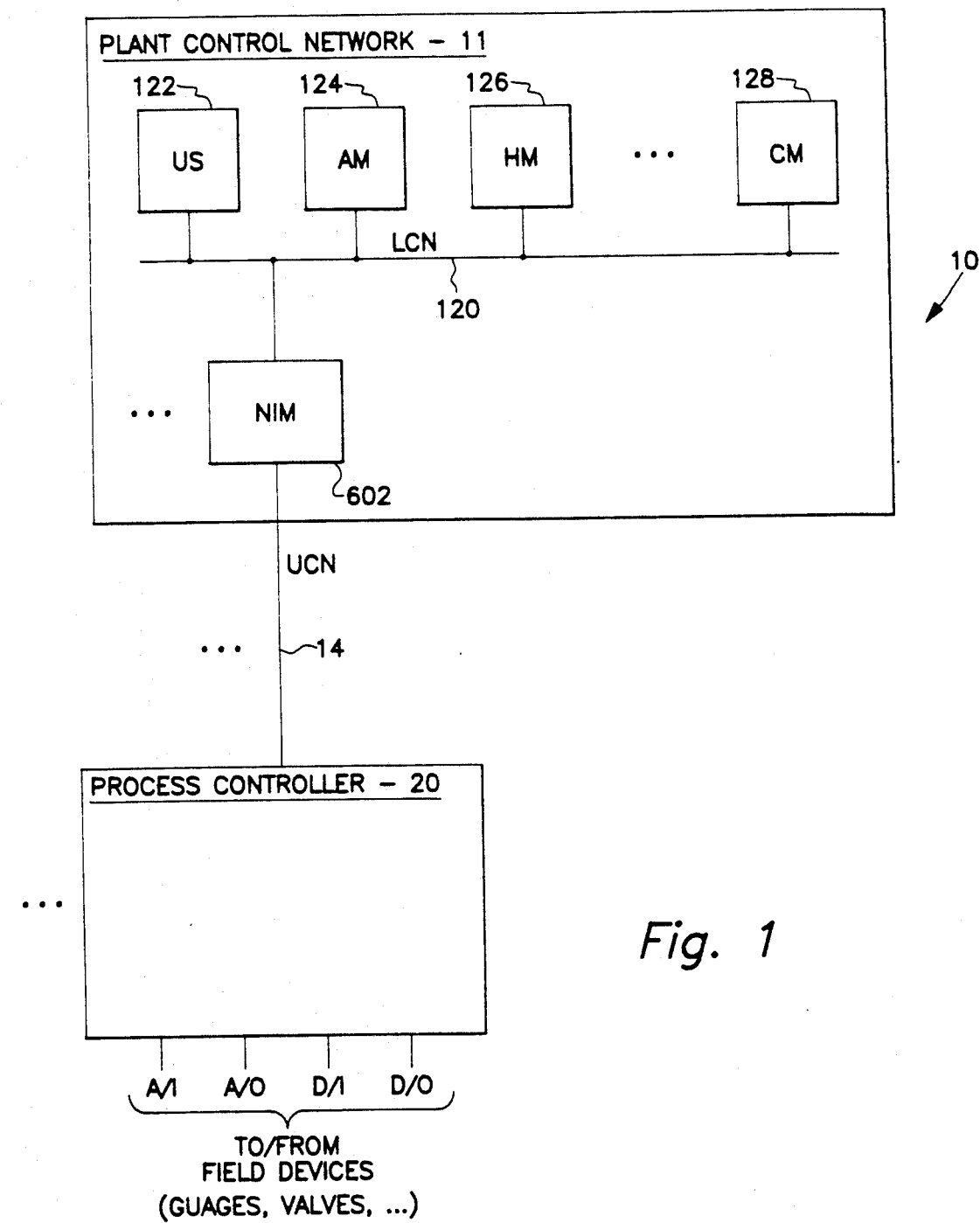
FIG. 1 shows a block diagram of a process control system in which the present invention can be utilized.

Before describing the method of the present invention, it will be helpful in understanding a system environment in which the present invention can be utilized. Referring to FIG. 1, there is shown a block diagram of a process control system 10 in which the present invention can be found. The process control system 10 includes a plant control network 11, in which a process controller 20 is operatively connected to the plant control network 11 via a universal control network (UCN) 14 to a network interface module (NIM) 602. In the preferred embodiment of the process control system 10, additional process controllers 20 can be operatively connected to the plant control network 11 via a corresponding UCN 14 and a corresponding NIM 602. The process controller 20, interfaces analog input and output signals, and digital input and output signals (A/I, A/O, D/I, and D/O, respectively) to the process control system 10 from the variety of field devices (not shown) which include valves, pressure switches, pressure gauges, thermocouples, . . . .

The plant control network 11 provides the overall supervision of a controlled process, in conjunction with the plant operator, and obtains all the information needed to perform the supervisory function, and includes an interface with the operator. The plant control network 11 includes a plurality of physical modules, which include a universal operator station (US) 122, an application module (AM) 124, a history module (HM) 126, a computer module (CM) 128, and duplicates of these modules (and additional types of modules, not shown) as necessary to perform the required control/supervisory function of the process being controlled. Each of these physical modules is operatively connected to a local control network (LCN) 120 which permits each of these modules to communicate with each other as necessary. The NIM 602 provides an interface between the LCN 120 and the UCN 14. A more complete description of the plant control network 11, and the physical modules can be had by reference to U.S. Pat. No. 4,607,256.

Figure 2:
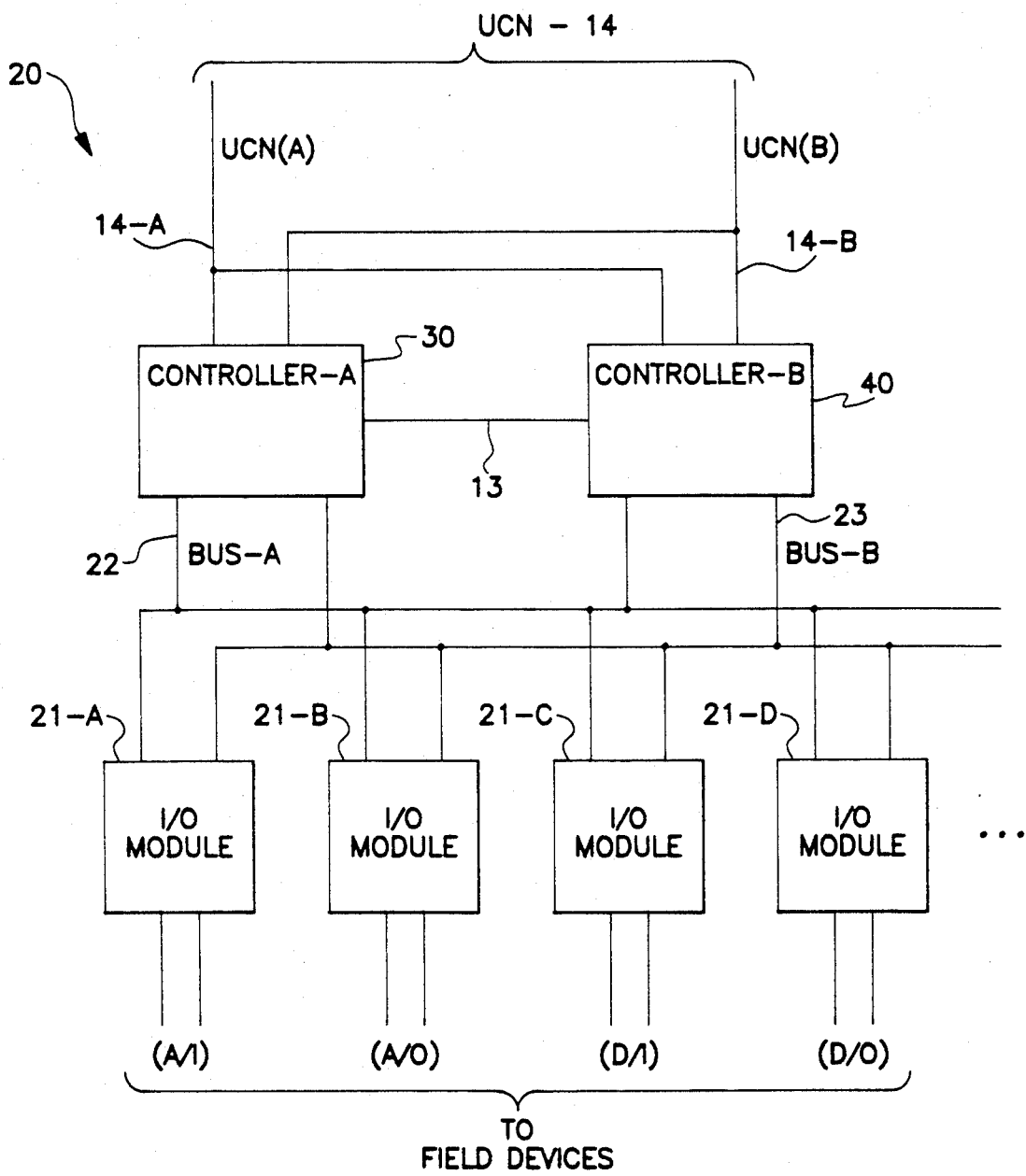
FIG. 2 shows a block diagram of a process controller, including I/O modules (IOP), in which the present invention can be utilized.

Referring to FIG. 2 there is shown a block diagram of the process controller 20. The process controller 20 of the preferred embodiment of the process control system 10 includes a controller A 30 and a controller B 40, which effectively operate as a primary and secondary controller. Controller A 30 and controller B 40 are connected to the UCN 14, the UCN 14 in the preferred embodiment, comprising for communication redundancy purposes, a UCN(A) 14A and a UCN(B) 14B. Input/output processors (IOPs) (sometimes referred to herein as input output (I/O) modules) 21 interface to field devices, field devices being various valves, pressure switches, pressure gauges, thermocouples, . . . which can be analog inputs (A/I), analog outputs (A/O), digital inputs (D/I), and digital outputs (D/O). The controller A 30 interfaces to each I/O module 21 via a bus A 22, and controller B 40 interfaces to each I/O module 21 via a bus B 23. In addition, once again for communication redundancy purposes, controller A 30 is also connected to bus B 23 and controller B 40 is connected to bus A 22.

Controller A and controller B, 30, 40, can communicate with each other via three mediums, the UCN 14, a link 13 between the controllers, and the buses A, B, 22, 23, with bus A and bus B in the preferred embodiment being serial I/O links. One controller (controller A 30 or controller B 40) operates as a primary controller and the other controller operates as a secondary controller (in more of a reserve mode than a back-up, in that if a failure of controller A 30 should occur, controller B is ready to take over the control function with essentially no start-up or initialization time). On a predetermined time basis, point processing is performed by the controller designated as the primary controller and communicates with the I/O modules 21. In addition, the controller acting as the primary controller communicates with the plant control network 11 reporting status, history, and accepting inputs from the plant control network such as commands from the operator via the universal station 122. In addition, a data base maintained by the primary controller is communicated to the secondary controller via link 13. As mentioned above, one controller operates as a secondary controller; however, it will be understood by those skilled in the art that a secondary controller is not necessary for the process controller 20.

Figure 3:
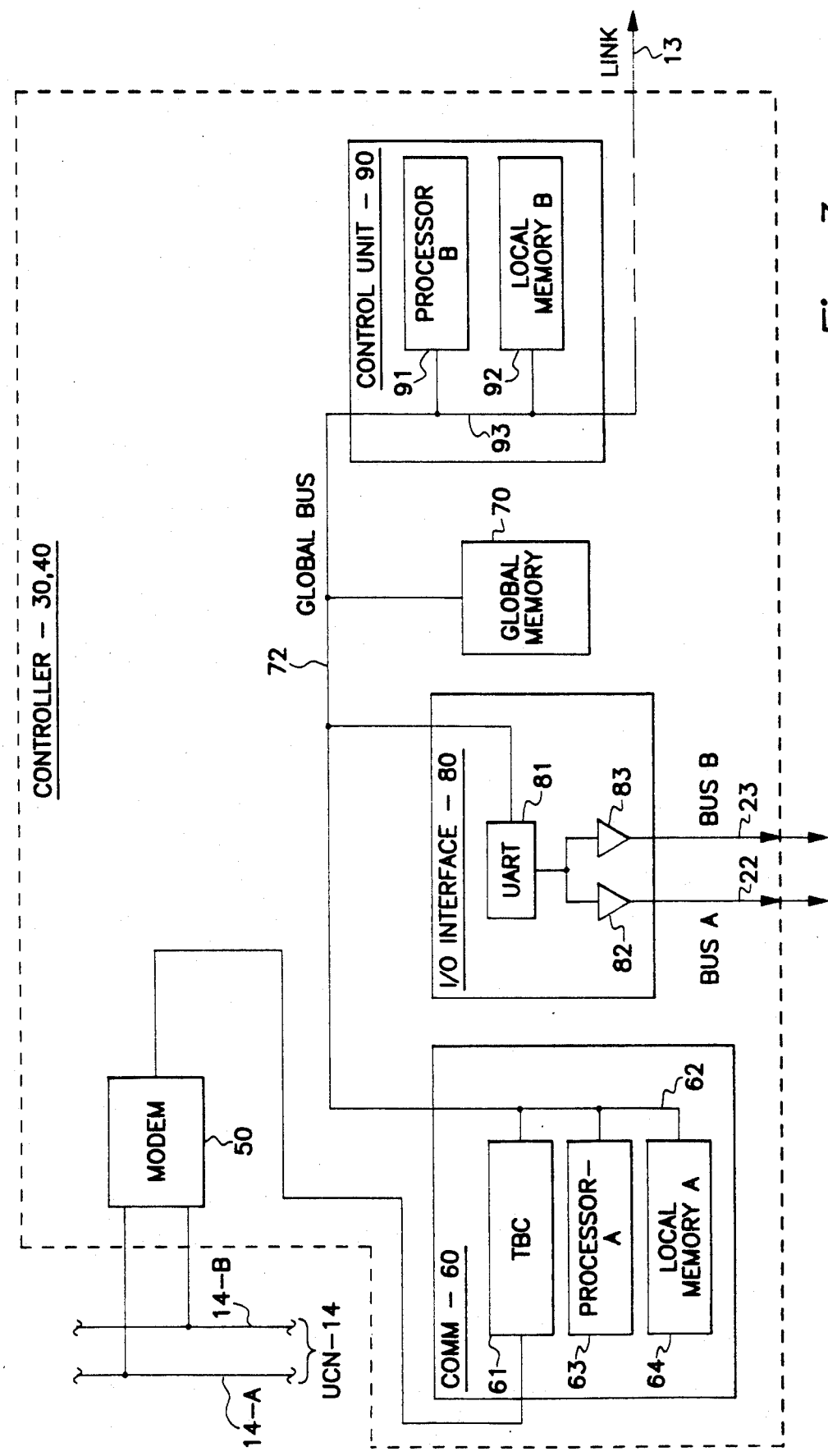
FIG. 3 shows a block diagram of a controller which is included in the process controller of FIG. 2.

Referring to FIG. 3, there is shown a block diagram of the controller 30, 40. A modem 50 is connected to the UCN 14, the modem having two inputs, one connected to UCN 14A and the other connected UCN 14B. The modem 50 interfaces with a communication unit (COMM) 60 which in turn interfaces with a global memory 70, an I/O interface unit 80, and a control unit 90 via global bus 72. The communication unit 60 includes a communication control unit, in the preferred embodiment a token bus controller (TBC) 61, Motorola type 68824, which is connected to a local bus 62. A processor A 63 (which essentially performs the communication function) is connected to the local bus 62, and a local memory A 64, which is also connected to the local bus 62. The processor A 63 communicates with the plant control network 11 via modem 50 and TBC 61. The local memory A 64 stores information, including personality image which is downloaded from the plant control network 11, for use by processor A 63 and TBC 61. The global memory 70 stores information which is common to both processor A 63 and a processor B 91. It also stores all the data received from bus A 22 and bus B 23. The global memory 70 also serves as an interprocessor communication vehicle between the processors A 63 and B 91. Control unit 90 includes the processor B 91 and a local memory B 92, both connected to a local bus 93. Processor B 91 performs the control function (i.e., control processing) relating to the field devices. This essentially includes performing the point processing, and updating the local memory B 92 and global memory 70. Also coupled to the local bus 93 of control unit 90 is a track unit (not shown) which is utilized to implement the data base transfer via link 13 to the other controller 30, 40 of the process controller 20. A more detailed description of the track unit can be had by making reference to patent applications:

(a) patent application Ser. No. 07/299,857, entitled "APPARATUS FOR TRACKING PREDETERMINED DATA FOR UPDATING A SECONDARY DATA BASE," by P. Gerhart, filed on Jan. 23, 1989; and (b) patent application Ser. No. 07/299,859, entitled "METHOD FOR CONTROL DATA BASE UPDATING OF A REDUNDANT PROCESSOR IN A PROCESS CONTROL SYSTEM," by P. McLaughlin et al, filed on Jan. 23, 1989;

both of the above-identified applications assigned to Honeywell Inc., the assignee of the present application. The I/O interface unit 80 includes a receiver-transmitter device, this device being a UART (Universal Asynchronous Receiver/Transmitter) 81. The UART 81 is coupled through drivers 82, 83 to bus A 22 and bus B 23, respectively.

Processor B 91 receives data from the various field devices through global memory 70, performs the necessary point processing and control function, and then updates the local memory B 92 and global memory 70, as required. The communication unit 60, in response to commands from the control unit 90 via global memory 70, inputs and outputs data between the I/O modules 21 (via the I/O interface unit 80) and the global memory 70, thereby relieving the control unit 90 from the burden of I/O module management. In this manner the control processing is performed by the control unit 90 within the process controller 20 for the predefined attached field devices, and the communication (i.e., the I/O control) is handled by the communication unit 60 through the UART 81.

Figure 4:
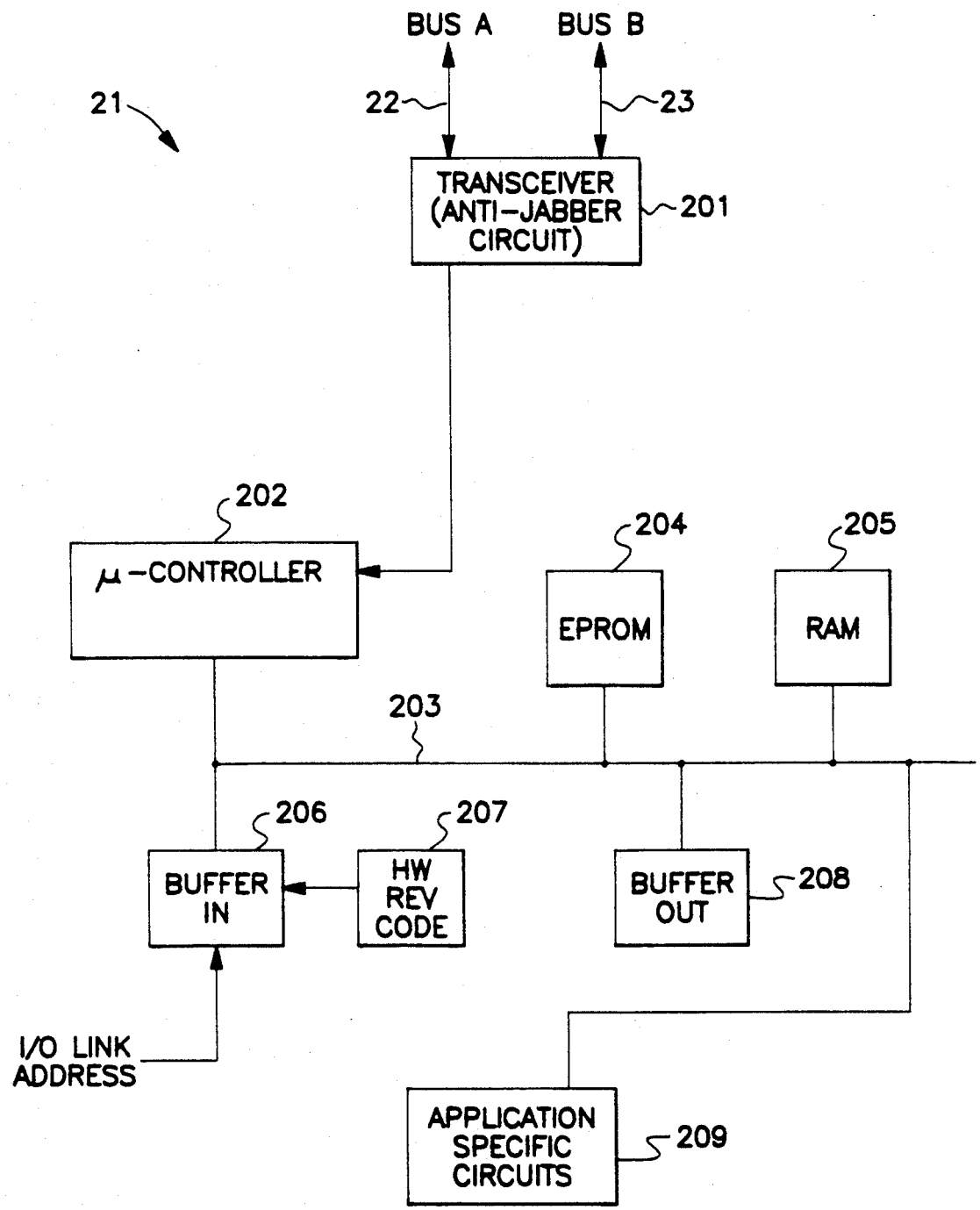
FIG. 4 shows a block diagram of an I/O module which is included in the process controller of FIG. 2.

Referring to FIG. 4 there is shown a block diagram of an I/O module. A transceiver (anti-jabber circuit) 201 interfaces with bus A 22 and bus B 23. The transceiver 201 interfaces with a microcontroller (u-controller) 202 which, in the preferred embodiment, is of the type, Intel 80C31. The microcontroller is coupled to a local bus 203, and includes an EPROM 204 and a RAM 205 also connected to the local bus 203. The RAM 205 contains the information which forms the database for the I/O module 21. The EPROM 204 contains the program information utilized by the microcontroller 202. Also attached to local bus 203 is an input buffer which receives the I/O link address information from the I/O link (bus A, bus B, 22, 23). The output buffer (BUFFER OUT) 208 is connected to the local bus 203. The application specific circuits 209 are also connected to the local bus 203 and interfaces with the input and output buffers 206, 208, and the microcontroller 202 via the local bus 203. The application specific circuits 209 vary from I/O module to I/O module depending on the field device to which the I/O module is to be coupled. If the field device is of a type which requires a digital input, then the application specific circuit 209 will include the logic in order to place the digital input into a predefined format which will interface with the remainder of the I/O module. Likewise, if the field device is such that requires an analog input, then the application specific circuit contains logic which converts the analog input signal (via an A/D converter) into a format again consistent with predefined formats. In this manner, the I/O modules are referred to as a specific I/O module type. The microcontroller 202 performs the I/O processing (or preprocessing) for the application specific circuits 209. The preprocessing will vary from each I/O module 21 depending on the type (i.e., A/I, A/O, ...) the preprocessing essentially consisting of translating the signals from the application specific circuits to a format compatible with the controller 30, 40, and putting the signals from controller 30, 40 in a format compatible with the I/O module 21. Some of the preprocessing performed includes zero drift, linearization (linearizing thermocouples), hardware correction, compensation (gain compensation and zero compensation), reference junction compensation, calibration correction, conversions, checking for alarms (limits) ... and generating a signal in a predetermined format having predetermined scale (i.e., engineering units, normalized units, percent of scale, ...). In the preferred embodiment seven types of applications specific circuits are provided for, these include a high level analog input, low level analog input, analog output, digital input, digital output, smart transmitter interface, and pulse input counter.

Figure 5:
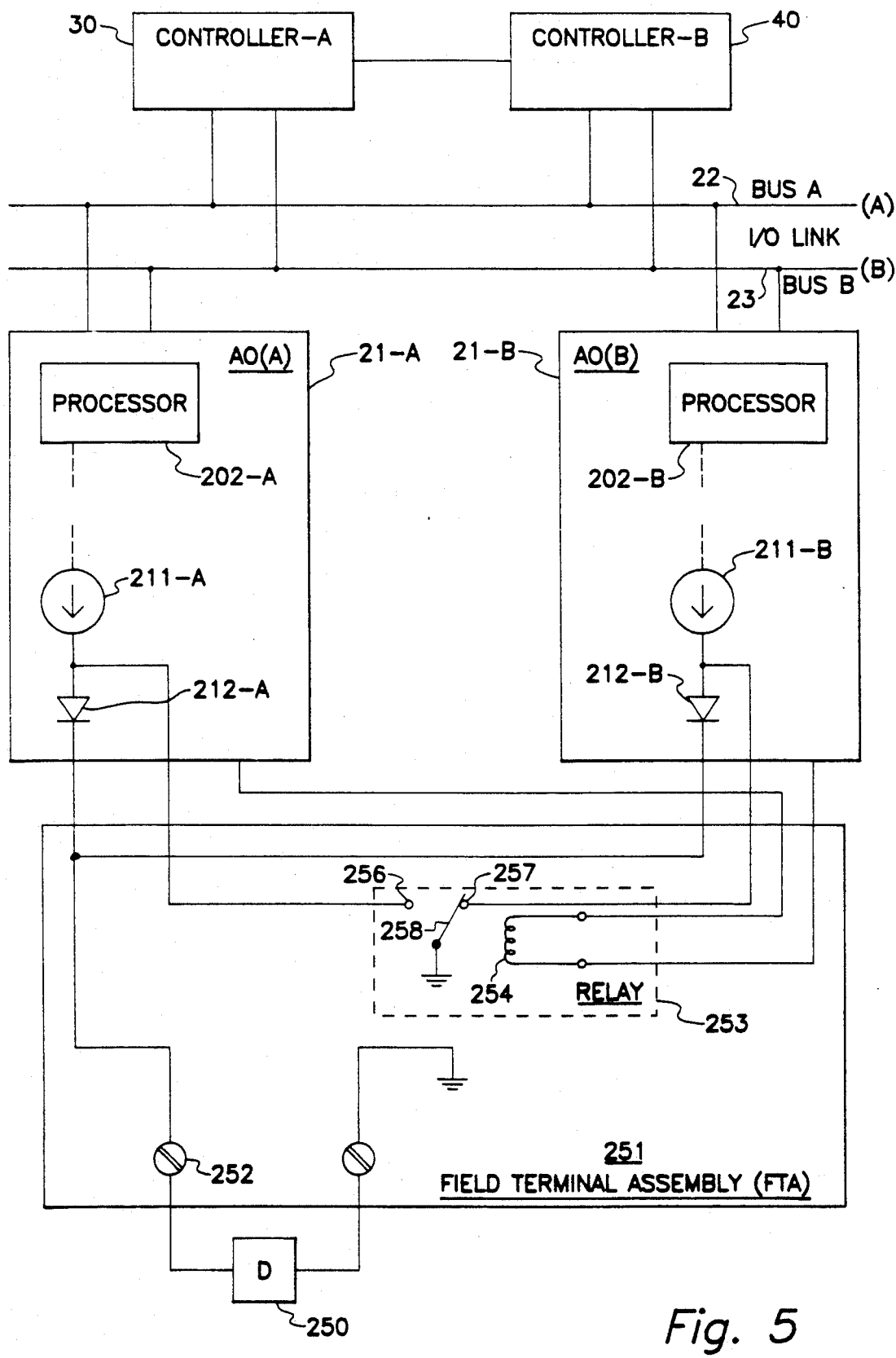
FIG. 5 shows a block diagram of the redundancy scheme of the I/O module within the process controller of FIG. 2.

Referring to FIG. 5, there is shown a functional block diagram of a field terminal assembly (FTA) 251 utilized to implement the redundancy scheme of the I/O modules 21 within the process controller 20. As described above, the process controller 20 includes controller A 30 and controller B 40 connected to the I/O link 22, 23. Also connected to the I/O link 22, 23 are the I/O modules 21 (also referred to herein as input/output processor IOP). In the redundancy scheme of the IOPs as utilized in the preferred embodiment of the process controller 20, the analog output type I/O module 21 is duplicated, shown in FIG. 5 as AO(A) 21-A and AO(B) 21-B. (Other I/O modules are connected to the I/O link 22, 23 as discussed above, but are not shown here for simplicity.) Each IOP includes a processor 202-A, 202-B, as described above. IOP AO(A) and IOP AO(B) are both connected to a field device (D) 250, through a field terminal assembly (FTA) 251, the field device being a valve, thermocouple, .... Both IOPs, AO(A) 21-A and AO(B) 21-B are performing the same tasks and outputting the same information (presuming no errors in either IOP) to the FTA 251. However, the output from only one IOP is actually coupled to the field device 250, as will now be discussed.

One IOP is designated the main or primary IOP and the other is designated the backup or redundant IOP.

Here, IOP AO(A) 21-A is designated the main IOP interfacing with field device 250, and IOP AO(B) 21-B is designated the redundant IOP. Both IOPs are outputting the same information from a corresponding current source 211-A, 211-B. The output information is coupled to a common point 252 (a terminal sometimes referred to as the customer screw), through a corresponding diode 212-A, 212-B. A common point between the current source 211-A and diode 212-A of AO(A) 21-A is coupled to a first contact point 256 of a relay 253 and a common point between current source 211-B and diode 212-B of AO(B) 21-B is coupled to a second contact point 257 of relay 253. The arm 258 of relay 253 is connected to a ground point and is also normally switched (i.e. no current through the coil 254), to the second contact point of the relay 253, such that the output of the second current source 211-B of AO(B) 21-B is shorted to ground. In this manner only the output information from AO(A) 21-A is coupled to the field device 250. In the event of a failure of AO(A) 21-A, the relay 253 switches such that the output from AO(A) 21-A is shorted to ground and the output from the redundant IOP AO(B) 21-B is immediately coupled to the customer screw 252, and thus to the field device 250. The switching of relay 253 is initiated by activating a coil 254 of relay 253.

One terminal of relay coil 254 is connected to AO(A) 21-A and the other terminal of relay coil 254 is connected to AO(B) 21-B. Normally, the relay is switched (no current through coil 254) such that IOP(A is communicating with the field device 250 and IOP(B) is in the backup mode (i.e., the IOP(B) output is shorted to ground by the relay 253.) When an error is detected by the controller 30, the controller A 30 (or controller B 40 if it is functioning as the primary controller) initiates a command to the IOPs to switch the relay 253. (The IOPs, IOP(A) and IOP(B) can also affect the switch over if they detect an error.)

Figure 6:
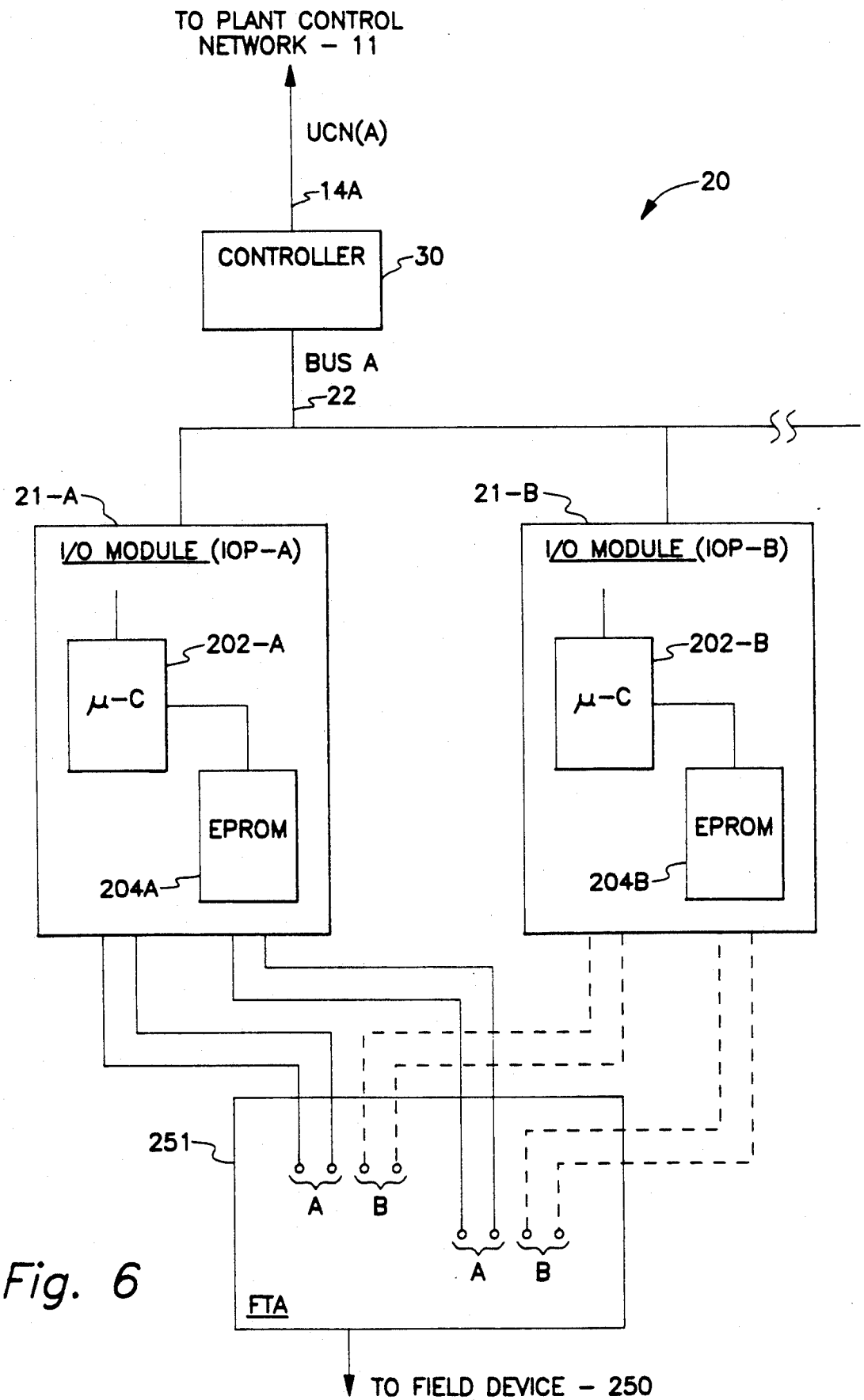
FIG. 6 shows a simplified block diagram of the process controller of FIG. 2.

The IOP redundancy will now be described. Referring to FIG. 6, there is shown a simplified block diagram of the process controller 20 of FIG. 2, having the redundancy of the controller omitted, and having an IOP and a backup IOP, only, for purposes of example. In the preferred embodiment, up to forty (40) IOPs can be included, and any mix of IOP types can be included in a redundant or non-redundant configuration. As will be recognized by those skilled in the art from the description above, the controller 30 performs as the master processor, the IOP module 21-A as the primary slave processor, and the IOP module 21-B as the backup (or secondary or redundant) slave processor.

For example purposes only, assume that the process controller 20 has controller 30 operating as the primary controller and I/O module 21-A (an analog output module) configured as module 1 in accordance with configuration rules of the process control system. IOP A 21-A is always present (assuming the requirement for an A/O IOP) and IOP B 21-B is optional (and initially assume it is not configured. Thus IOP B is shown in dotted lines in FIG. 6.) For example purposes, assume IOP(A) is placed in file address 3 and card address 8. (In the preferred embodiment of the system, the cabinet is divided in files (rows) and card slots.) Thus in this example the "printed circuit card" of an A/O IOP which is designated as IOP(A) 21-A is inserted in row 3, card slot 8. IOP(A) is given a logical address and assume that in this example is assigned logical address number 1. The controller 30 data base includes the data for an IOP connected to BUS-A 22 logical address 1, physical address of IOP(A) of file 3, card 8, and is initially non-redundant. (See State 1 of Table 1.) The controller 30 communicates to the primary slave IOP via the configured logical address. The process control system 10 is powered up and initialized along with the process controller 20, including controller 30 and IOP(A) 21-A, and running normally. IOP(A) 21-A is connected to the "A" points of FTA 251.

TABLE 1

| CONTROLLER 30 DATA BASE | | | |
|---|---|---|---|
| | State 1 Initial, Non-Redundant | State 2 Initial Redundant | State 3 Normal Redundant |
| Logical Address | 1 | 1 | 1 |
| Physical Address A | | | |
| File (rack, row, . . .) | 3 | 3 | 3 |
| Card (slot within file) | 8 | 8 | 8 |
| Physical Address B | | | |
| File | 0 | 4 | 4 |
| Card | 0 | 10 | 10 |
| Redundant (Yes or No) | N | Y | Y |
| Synchronized (Yes or No) | N | N | Y |
| Primary (A or B) | A | A | A |

At some later time, the backup slave IOP 21-B can be added while the system 10 is running. IOP(A) 21-A continues to run normally and IOP(B) 21-B is configured in any spare location in the file (cabinet, row, . . . ). IOP(B) is connected to the "B" terminals of FTA 251, and in accordance with the configuration rules of the system, information is outputted (from the universal station US 122 of the plant control network 11) relating to the IOP(B), including the location information and the fact that IOP(B) is the backup to module 1 (i.e., the module having logical address 1). That information is transmitted to controller 30 during normal operations of the system 10 and the controller data base is updated (reference state 2 of Table 1, assume IOP(B) 21-B has been located in file 4, card slot 10). It will be recognized by those skilled in the art that many techniques are available for the manual inputting of such information from an operator input terminal and will not be discussed further herein since it is not necessary for understanding the redundancy scheme of the present system. The present invention will now be described. The controller 30 then acts to synchronize the IOP(B) 21-B in accordance with the method of the present invention. Synchronizing is the process whereby the same data base is contained in IOP(B) 21-B that exists in IOP(A) 21-A. The information of the data base of IOP(A) is requested by the controller 30. IOP(B) 21-B eavesdrops on the transmissions of data from IOP(A) 21-A to the controller 30 and stores the information in its data base memory, thereby causing the data base of IOP(B) 21-B to be the same, whereupon IOP(B) is commanded to start executing. Once the controller 30 has read all of IOP(A) data base, i.e. IOP(B) has imaged the data, the controller enacts verification to ensure IOP(A) and IOP(B) data base have equivalent data at that point in time, and are both informed by the controller 30 that synchronization is successful and complete. IOP(B) performs the same operations as IOP(A) and outputs the same information to the FTA 251 at essentially the same time (however, each IOP is operating using its own clock). It will be recognized that IOP(B) 21-B is a dedicated backup. The operation of FTA 251, however, permits only IOP(A) or IOP(B) to reach the field device 250, as described above. Once IOP(B) is synchronized, the controller data base is updated as shown in state 3 of Table 1.

Figure 7:
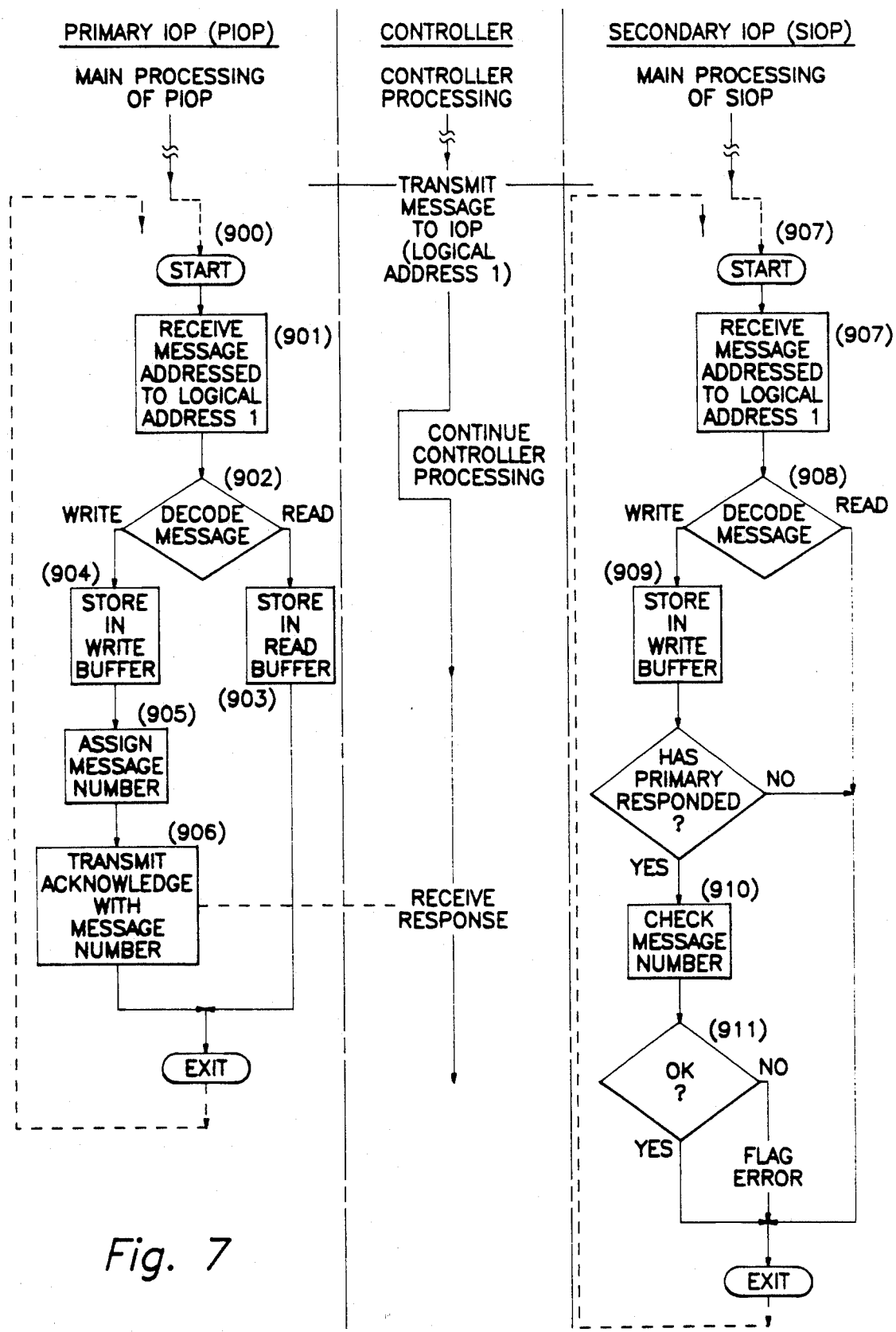
FIG. 7 shows a flow diagram of the communications scheme between the controller and the primary and secondary IOPs according to the method of the present invention.

Referring to FIG. 7, there is shown a flow diagram of the communications scheme between the controller and the primary and secondary IOPs for maintaining synchronization in accordance with the method of the present invention. In normal operation, all transfers (i.e., writes) to the IOP(A) 21-A from controller 30 are also received by IOP(B). IOP(B) eavesdrops on the communications since both IOP(A) and IOP(B) have a logical address of one in this example and the controller 30 communicates to the primary IOP by logical address. The controller is performing its main processing, the primary IOP is performing its main processing, and the secondary IOP is performing its main processing, which is the same as the primary IOP, but is running ahead or behind since each IOP is running off its own clock (this assumes initialization of the secondary IOP has been completed and is synchronized). At some point in time the controller transmits a message to IOP having a logical address of one. Both the primary IOP 21-A and the secondary IOP 21-B receive the message. The controller then continues with its main processing. However, the primary IOP breaks off from its main processing to accept the message received (block 900). The message addressed to logical address one is received (block 901) and the message is decoded (block 902). If a read message has been detected, the message is stored in a read buffer for subsequent reading of the requested data in the primary data base for subsequent transmittal to the controller (block 903). If a write message has been decoded the message is stored in a write buffer (block 904) and assigned a message number (block 905). An acknowledge message is then transmitted by the primary IOP (block 906) to the controller along with the message number assigned. The acknowledge message indicates to the controller that the message has been received and the message number indicates to the controller the message number assigned so that subsequent interrogations by the controller as to the status of the particular message request can be made by message number. (In this description write requests from the controller mean any changes to the data base.) Subsequent inquiries by the controller regarding the status of a message having a specific message number will result in a status return of in progress along with the message number. When the requested action is completed, which would normally take place during the main processing of the primary IOP, the status is updated to a complete status such that when a status request is made by the controller a complete status may be indicated. In the preferred embodiment of the method of the present invention, the completed status has three unique classes which include okay, warning, and failure. In this particular situation the failure means the action has not been taken because of some error (e.g., the point is not active, . . . ), and warning meaning that the action has taken place but the data has been modified (e.g. a request to open a valve 102% may be modified by the primary IOP to open the valve only 100%, . . . ).

The secondary IOP also receives the transmitted message having a logical address one, since the secondary IOP is aware of its primary partner's logical address. The secondary IOP breaks off from its main processing to accept the message (block 907). The received message is decoded (block 908) and if a read message has been detected the processing terminates and exits back to the main processing of the secondary IOP. If a write message has been detected, the message is stored in a write buffer (block 909) and after the primary has responded, the message number transmitted by the primary IOP to the controller in the acknowledge message is checked (block 910). If the primary fails to respond, the secondary ignores the message and exits. The message numbers are assigned sequentially so the secondary IOP has knowledge of the next message number to be allocated by the primary IOP (block 910). Also, during initial synchronization, the secondary IOP is made aware of the primary's current message number. If the message number checks out okay (block 911), the message processing routine of the secondary IOP exits and returns back to the main processing of the secondary IOP (block 911). If the message number is not the message number expected, an error is flagged for subsequently notifying the controller that an error, i.e. an incorrect message number, has been detected and that the secondary IOP is no longer in sync with the primary IOP. The secondary IOP in its main processing works on the same data as the primary IOP (assuming the message number check passed) but may occur at different times but in the same order. The secondary IOP, since it is running on its own clock, can be ahead or behind in its processing as compared to the main processing of the primary IOP.

Figure 8:
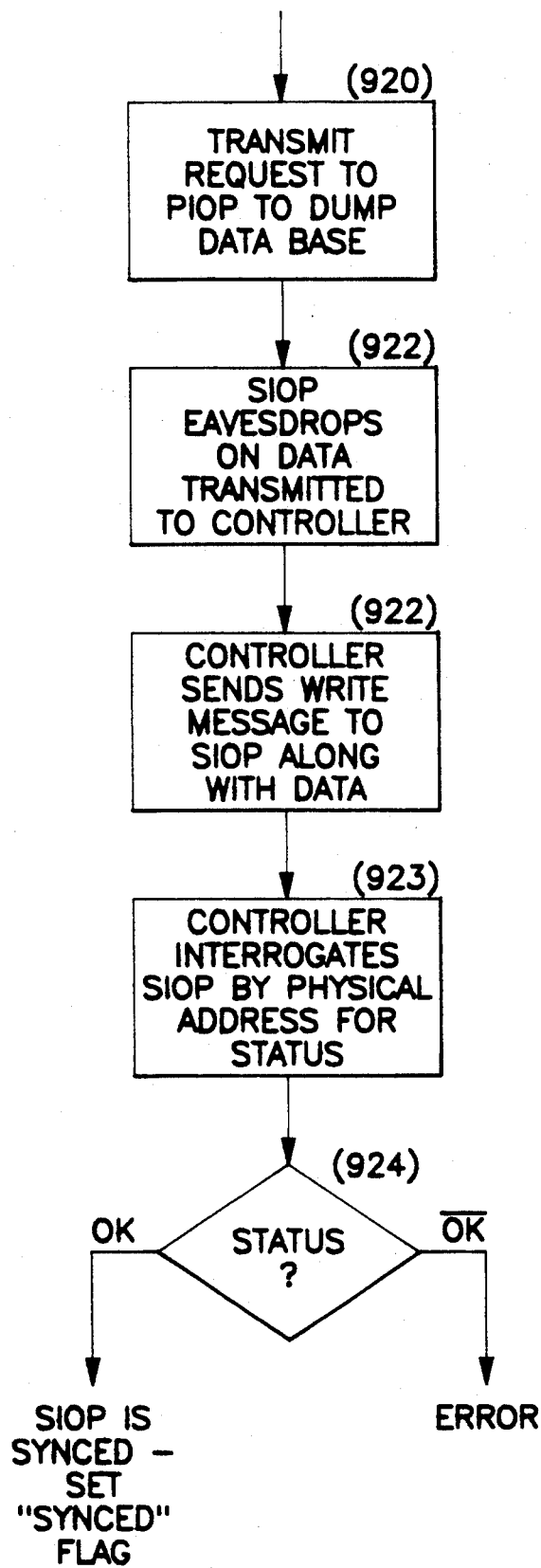
FIG. 8 shows a flow diagram of the initialization of the secondary IOP data base utilizing the communication scheme of the method of the present invention shown in FIG. 7.

Referring to FIG. 8, a flow diagram of the initialization of the secondary IOP is shown. Consistent with the communications scheme described above in conjunction with FIG. 7, the controller transmits a request to the primary IOP to read the data base (block 920). The read data base request is in the form of a DUMP command. Prior to sending the dump command, the controller 30 issues a FREEZE WRITE BUFFER command to the primary IOP. The freeze command is placed in the write buffer (recall that all inputs are placed in a queue in order of receipt). Both the primary and secondary IOP stop processing everything that comes after the freeze command (messages can be accepted from any source on the link, BUS A 22, but are not processed after detecting the freeze command). When the controller 30 detects that both IOPs are "frozen", the controller 30 initiates a DUMP sequence. The requested data, i.e. the data base, is transmitted to the controller by the primary IOP (block 921). The dump or read of the data base takes some predetermined number of read/transmit transactions to complete. The data base data being transmitted to the controller 30 includes a header and trailer which is predetermined and known to the secondary IOP, which is eavesdropping on these transmissions. The secondary IOP eavesdrops on the data base information being transmitted to the controller 30 and stores the information in its data base (block 922). In this manner the data base of the secondary IOP contains the same data as the primary IOP data base and can determine when the transmission is completed. The controller then interrogates the secondary IOP (by physical address) for status information (block 923). If the status checks out okay (block 924), the secondary IOP is synchronized and the controller sets the synchronized flag as consistent with the description above for Table 1. If the status indicates the transfer was not okay or that the data base update did not occur without any errors, an error is flagged and various error processing routines can take place, such as notifying the operator, set the status to non-synchronized, taking the secondary IOP offline, retry, . . . .

Figures 9A, 9B:
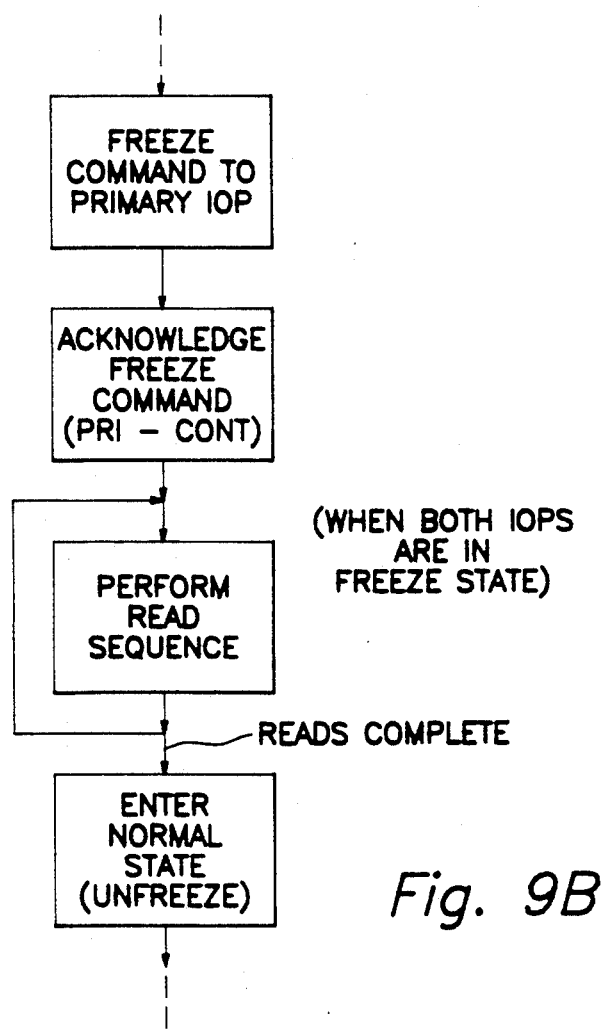
FIGS. 9A and 9B, shows the initial synchronization process of the method of the present invention.

The method of initial synchronization will now be described in conjunction with FIG. 9. Referring to FIGS. 9A and 9B, which together comprise FIG. 9, there is shown the initial synchronization process of the secondary IOP. For example purposes, the primary IOP is executing and the secondary IOP is executing with an unsynchronized data base. In accordance with the communications scheme described above, the primary IOP is receiving commands which are stored in a queue, and the secondary is also storing some commands (i.e., the write-type commands) in its queue. Referring to FIG. 9A, there is shown the primary and secondary queues with the contents of the respective queues. The controller 30 has transmitted commands CMD1 through CMD4 to the primary IOP, the primary IOP having responded with the message numbers indicated, and stored the commands in its queue. The secondary IOP has also received the same commands and stored them in its queue, checking the message number in accordance with communications scheme described above, except for CMD2, which was a read command and is essentially discarded by the secondary IOP. CMD1, which was received by the secondary has already been executed by the secondary and therefore does not currently show in its queue. The two IOPs are not in lockstep. However, the information order of the data and commands that come into the IOPs is the same.

The next command transmitted by the controller 30 is a FREEZE command, which is stored by both IOPs in their respective queues. Each IOP continues its processing, including processing the commands, until the freeze command is detected. (Additional commands can continue to come in from the controller 30 or any other IOP on the link. These commands get stored in the queues but do not get processed until the IOP receive an UNFREEZE command.) When the freeze command is detected no further processing occurs. When the controller 30 detects that both the primary and secondary IOPs are "frozen", the controller issues a DUMP command to the primary IOP. The DUMP command initiates a predetermined number of read transactions, in accordance with the scheme described above, whereby the primary IOP transmits information to the controller. However, this time (because of the DUMP command), the transmissions are eavesdropped by the secondary IOP, accepts the information and stores the information in its data base. The primary and secondary IOPs have predetermined knowledge of the number of records, format of the records, . . . . On the last read transaction of the DUMP command, the primary IOP indicates the last read to the controller 30 indicating the end of the data base information. At this point in time, the data bases of the primary and secondary IOPs are the same. Both IOPs, knowing that the DUMP operation is completed (and have detected no errors), in the preferred embodiment of the present invention "unfreeze" themselves, i.e. both the primary and secondary IOP start processing and begin normal execution. Thus, each IOP processes CMD5 in their respective queues and continue normally. FIG. 9B shows a flow diagram of the DUMP operation of the preferred embodiment of the present invention.

Again, in normal operation, all transfers (i.e., writes) to the IOP(A) 21-A from controller 30 are also received by IOP(B). IOP(B) eavesdrops on communications since both IOP(A) and IOP(B) have a logical address of one in this example and the controller 30 communicates to the IOPs by logical address. In this manner, synchronization of IOP(B) is maintained, and no extra communications are necessary and no extra communication time is taken. In the present system, IOP(A) and IOP(B) do not initiate communications with controller 30, but respond to requests for information. In the secondary mode, the secondary IOP does not respond to write requests when the controller addresses the IOP by logical address, but does respond to the controller when the physical address is utilized. Periodically, the controller addresses both the primary and secondary IOPs to verify that no errors have occurred.

While there has been shown what is considered the preferred embodiment of the present invention, it will be manifest that many changes and modifications can be made therein without departing from the essential spirit and scope of the invention. It is intended, therefore, in the annexed claims, to cover all such changes and modifications which fall within the true scope of the invention.

We claim:

1. In a process control system, having a master controller and at least one pair of slave input/output processors (IOP's) wherein a first IOP of the pair is a primary slave IOP and a second IOP of the pair is a secondary slave IOP, the first and second IOP having a first and second data base, respectively, the first and second IOP each executing the same tasks utilizing a first and second clocking system, respectively, and further wherein the data bases of the first and second IOPs are synchronized, communications by the master controller being made only to the first IOP including communications which modify the first data base, a method for maintaining synchronization between said first and second IOP comprising the steps of:
   a) transmitting a message addressed to the first IOP by the master controller;
   b) receiving the message by the first IOP for subsequent execution;
   c) acknowledging receipt of the message by a transmission of an acknowledge message back to the master controller, the acknowledge message including a message number;
   d) eavesdropping, by the second IOP, on transmissions from the master controller to the first IOP, and on transmissions from the first IOP to the master controller;
   e) upon recognition that the message is addressed to the corresponding first IOP and that the message is of a predetermined type, receiving the message by the second IOP for subsequent execution; and verifying the message number in the acknowledge message by the second IOP, the acknowledge message for the first IOP to the master controller having been received by the second IOP as a result of the eavesdropping step, the message number being determinable by the second IOP, such that when both the first and second IOP complete execution of the received message which results in an update of the respective data bases, both data bases continue to contain the same information thereby maintaining synchronization.

2. A method of maintaining synchronization according to claim 1 wherein the step of transmitting a message to the first IOP, the first IOP is addressed by the master controller by a logical address.

3. A method of maintaining synchronization according to claim 2 wherein the step of acknowledging, the message number utilized in said acknowledge message is a sequential number for each transmission received, an initial message number having been transmitted to the second IOP during an initialization of said second IOP.

4. A method of maintaining synchronization according to claim 3, wherein the step of receiving the message by the second IOP, the message of a predetermined type being a write-type message which causes data in the data base to be modified.

5. A method for maintaining synchronization according to claim 4, wherein the step of receiving the message by the second IOP, the second IOP performing the recognition, that the message being transmitted is addressed to the corresponding first IOP, by recognizing the logical address of the first IOP, the corresponding second IOP having the same logical address as the corresponding first IOP.

6. A method for maintaining synchronization according to claim 5, further comprising the step of:

indicating to the master controller by the second IOP loss of synchronization upon detection that the message numbers disagree.

7. A method for maintaining synchronization, according to claim 1, wherein predetermined type messages received by the first and second IOP are stored in a queue in the order received, further comprising the steps of:

a) upon execution of a freeze-type command, stopping normal execution;

b) upon receipt of a dump-type command, performing a predetermined series of reads from the first IOP to the master controller;

c) because of the dump command, eavesdropping on the transmissions of step (b) by the second IOP to capture the information being transmitted from the first IOP to the master controller;

d) repeating steps (b) and (c) a predetermined number of times; and e) if no errors have been detected, beginning normal execution by the first and second IOPs.

* * * * *